United States Patent [19]

Setzer et al.

[11] 4,415,484

[45] Nov. 15, 1983

[54] AUTOTHERMAL REFORMING CATALYST

[75] Inventors: Herbert J. Setzer, Ellington; Roger R. Lesieur, Enfield; Sam Karavolis, East Hampton, all of Conn.

[73] Assignee: United Technologies Corporation, Hartford, Conn.

[21] Appl. No.: 372,253

[22] Filed: Apr. 26, 1982

[51] Int. Cl.$^3$ .................. B01J 21/04; B01J 23/58
[52] U.S. Cl. .................... 502/332; 423/651
[58] Field of Search ............. 252/466 PT; 423/651

[56] References Cited

U.S. PATENT DOCUMENTS

| | | | |
|---|---|---|---|
| 2,038,566 | 4/1936 | Huettner | 23/212 |
| 3,222,132 | 12/1965 | Dowden | 423/652 |
| 3,320,182 | 5/1967 | Taylor et al. | 252/466 |
| 3,403,111 | 9/1968 | Colgan et al. | 252/465 |
| 3,522,024 | 7/1970 | Billings et al. | 48/214 |
| 4,008,180 | 2/1977 | Rausch | 252/466 PT |
| 4,094,821 | 6/1978 | McVicker et al. | 252/466 PT |
| 4,101,449 | 7/1978 | Noda et al. | 252/457 |
| 4,124,490 | 11/1978 | Collins et al. | 208/139 |
| 4,141,817 | 2/1979 | McVicker et al. | 208/139 |
| 4,155,835 | 5/1979 | Antal | 208/89 |
| 4,183,829 | 1/1980 | Adachi et al. | 252/466 PT |
| 4,216,123 | 8/1980 | Banks et al. | 252/466 |

FOREIGN PATENT DOCUMENTS 52-31994  3/1977  Japan ........................... 252/466 PT Primary Examiner—W. J. Shine
Attorney, Agent, or Firm—Harry J. Gwinnell

[57] ABSTRACT

High activity steam reforming catalysts are described particularly adapted for use in autothermal reforming processes. A rhodium catalyst on a calcium oxide impregnated alumina substrate allows the autothermal reforming process to take place with substantially no carbon plugging at oxygen to carbon ratios below what had been considered critical for avoiding carbon plugging of the catalyst in the past.

2 Claims, 4 Drawing Figures

4,415,484

AUTOTHERMAL REFORMING CATALYST

TECHNICAL FIELD

The field of art to which this invention pertains is catalytic reforming of gaseous and/or liquid hydrocarbons utilizing the injection of steam to produce hydrogen.

BACKGROUND ART

In the production of hydrogen, it is well known in the art to treat hydrocarbon material with a catalyst at high temperatures in the presence of steam. The hydrocarbon materials generally used are natural gas and naphtha which have been desulfurized to 0.1 part per million (ppm, by weight) sulfur. Hydrogen, carbon monoxide and carbon dioxide are the products of the reaction. These products are often cooled and passed over a shift conversion catalyst where the carbon monoxide is further reacted with steam to produce additional hydrogen and carbon dioxide.

Hydrogen generators and especially hydrogen generators for fuel cell powerplants may be required to operate with heavier fuels and, in the future, coal derived liquids. These heavier distillate fuels cannot readily be desulfurized to the 0.1 ppm sulfur level that is required for the conventional steam reforming process. Direct reforming of heavier fuels without desulfurization require higher temperatures to overcome the reduction in catalytic activity in the presence of sulfur. When the commercially available nickel steam reforming catalysts are used in this fashion, carbon deposition and reactor plugging occur and reactor operation cannot be sustained. The problem of carbon formation with conventional nickel catalysts can be overcome by adding air or oxygen to the hydrocarbon/steam fuel mixture. At oxygen to carbon ratios ($O_2/C$) equal to or greater than 0.42–0.46 carbon formation is eliminated with a 1360° F. (738° C.) preheat. In order to maximize the hydrogen production it is desirable to lower the oxygen to carbon ratio below 0.42. For example, for fuel cell powerplant applications, $O_2/C$ in the range of 0.35 are desirable.

In general, conventional autothermal reformers utilize high activity nickel reforming catalysts containing 15–25% nickel on α-alumina or magnesia doped alumina. However, in use, the nickel-reforming catalysts are subject to carbon plugging if the oxygen to carbon ratio falls below a critical level (note the partial oxidation reaction above). As would be expected, the oxygen to carbon ratio required for efficient operation of an autothermal reformer would be lower than the critical oxygen to carbon ratio necessary to prevent carbon plugging of the nickel reforming catalyst in this environment. For example, for autothermal reactor operation, oxygen to carbon ratios of 0.35 or less are required, whereas typical critical oxygen to carbon ratios for such a reactor are 0.42 to 0.46 at a 1360° F. (738° C.) reactant preheat temperature.

Accordingly, what is needed in this art is a reforming catalyst particularly adapted to use in an autothermal reformer which is less sensitive to oxygen level and specifically less sensitive to carbon plugging because of critical oxygen to carbon ratios.

DISCLOSURE OF INVENTION

The present invention is directed to a catalyst specifically adapted for use in autothermal reforming systems which substantially eliminiates carbon plugging at levels below what had been considered in the past as critical oxygen to carbon ratios. Furthermore, it has been found that such carbon plugging is eliminated with reformer fuels with boiling points up to that of No. 2 fuel oil. These catalysts comprise rhodium on a calcia impregnated alumina support.

Another aspect of the invention comprises an autothermal reforming process utilizing such catalysts.

The foregoing, and other features and advantages of the present invention, will become more apparent from the following description and accompanying drawings.

BEST MODE FOR CARRYING OUT THE INVENTION

The $Al_2O_3$ is preferably used in pellet form, such pellets sized based on reactor are size and other system variables. They are typically about 0.125 inch (0.318 cm) in diameter with an average length of about 0.14 inch (0.356 cm) and are available commercially from Harshaw Chemical Co., Cleveland, Ohio (designated Al-4104E).

The calcium oxide is added to the alumina by impregnating the alumina with a solution (preferably aqueous) of a calcium salt (preferably calcium nitrate) followed by drying to remove the solvent, and calcining in air to oxidize the deposited salt to calcium oxide. Calcining temperatures may vary depending on the particular salt used, but generally temperatures of about 1850° F. (1010° C.) are used, e.g. for calcium nitrate. Enough calcium salt is deposted on the support material such that after calcining about 10% to about 35% calcium is present in the support material, and preferably about 15% by weight.

Magnesium promoted, calcia stabilized alumina can also be used and is prepared by impregnating the stabilized alumina with a solution (preferably aqueous) of a magnesium salt (preferably magnesium nitrate) followed by drying to remove the solvent, and calcining in air to oxidize the deposited salt to magnesium oxide. Calcining temperatures may vary depending on the particular salt used, but generally temperatures in the range of about 1800° F. (982° C.) are used, e.g. for magnesium nitrate. Enough magnesium salt is deposited on the support material such that after calcining about 3% to about 15% magnesium is present in the support material, and preferably about 5% by weight.

The rhodium catalyst material according to the present invention is deposited on the substrate material by any conventional method in this art, and preferably out of aqueous solution. Rhodium salts and typically the nitrates are dissolved in either aqueous or organic solvents and dried on the substrate. Amounts of rhodium used may vary over a wide range, but are generally used in amounts based on catalyst plus support material of about 0.01% to about 6% rhodium, and preferably about 0.5% by weight.

EXAMPLE

A solution consisting of 552.5 grams of $Ca(NO_3)_2.4H_2O$ dissolved in 163 ml of $H_2O$ was used to impregnate 295 grams of Harshaw Al-4104E alumina. The impregnated material was placed in an ultrasonic blender for 2 minutes and then allowed to stand for 30 minutes. The excess solution was decanted, and the impregnated support dried overnight at 250° F. and calcined at 1576° F. over the weekend (85 hours) and then at 1900° F. for 2 hours. 407 grams of this material was then impregnated with a solution of 6.5 grams of $Rh(NO_3)_3.2H_2O$ in 233 ml of aqueous solution. The material was placed in an ultrasonic blender for 5 minutes, allowed to stand overnight and dried at 110° C. for 3 hours.

Figure 1:
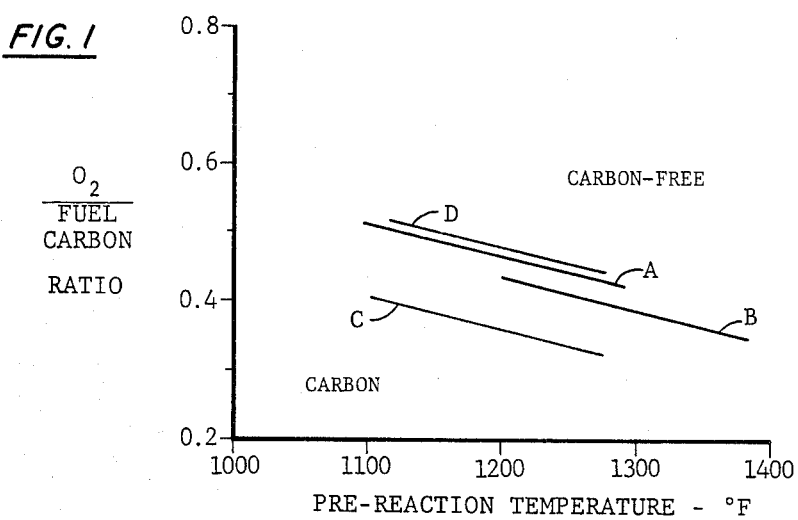
FIG. 1 shows regions of carbon-free steam reforming operation for various catalysts as a function of oxygen to fuel carbon and reaction temperature.

An example of the improved performance of catalysts according to the present invention as shown in FIG. 1 where A is CaO impregnated $Al_2O_3$; B is iron oxide on CaO impregnated $Al_2O_3$; and C is the rhodium on CaO impregnated $Al_2O_3$ of the present invention and D commercial nickel catalyst (25% by weight nickel on alpha alumina) (and results shown in FIGS. 1 and 3).

Testing was performed in an autothermal reformer 2 inches (5.08 cm) in diameter and about 24 inches (60.96 cm) long. Heat was provided by internal combustion of the fuel and air. No. 2 fuel oil was used as the fuel.

It can be seen that not only is there a reduction in carbon formation on the rhodium catalyst material using the No. 2 fuel oil, but the oxygen to fuel level can be kept significantly lower than with conventional nickel catalysts and even metal oxides resulting in improved quality of hydrogen produced and increase in reforming efficiency.

Figure 2:
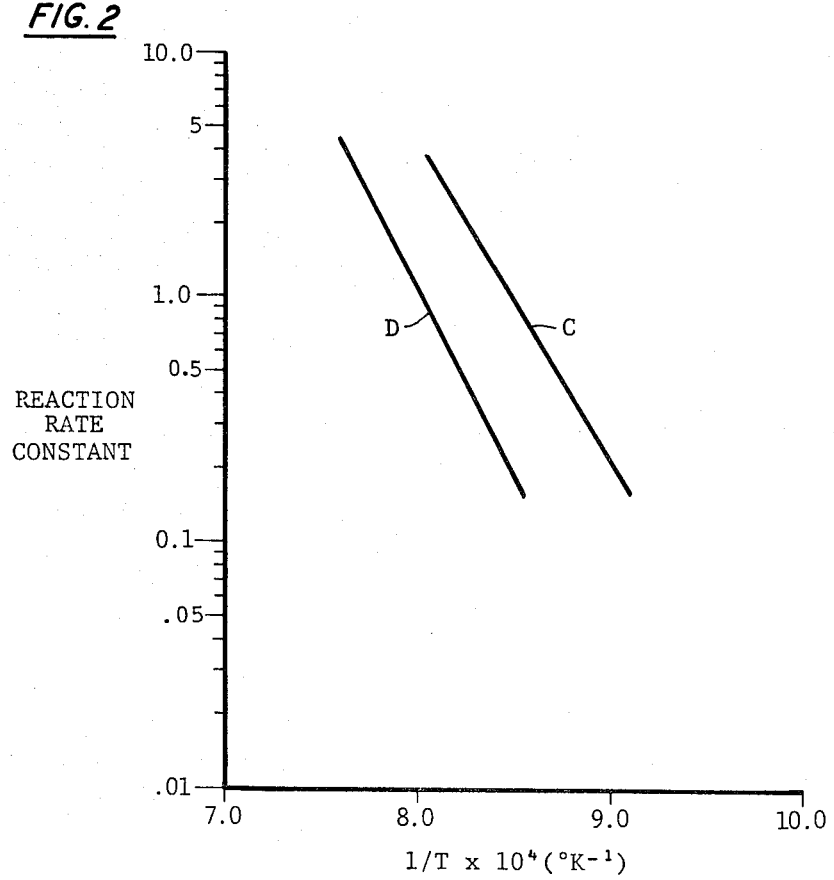
FIG. 2 shows activity of catalyst material according to the present invention as a function of temperature.

FIG. 2 also shows the improved performance characteristics of catalysts according to the present invention where D is a commercial nickel reforming catalyst and C is rhodium on CaO impregnated alumina according to the present invention.

The reactants were steam reformed in an isothermal tubular steam microreformer 0.305 inch (0.775 cm) inner diameter containing 1 inch (2.54 cm) in length, or 0.5 gram, of catalyst material. Ethane containing 2,225 parts per million by weight $H_2S$ (at about 1 atmosphere pressure) was used as the fuel.

In FIG. 2, the data for catalysts is shown on a conventional Arrhenius Graph. In this graph, the reaction rate constant (k) is plotted against the reciprocal of the absolute test temperature. The reaction rate constant (k) (synonymous with activity) is defined by the pseudo-first order rate equation:

$$k = (\text{space velocity}) \times \ln\left(\frac{1}{1 - \frac{\% \text{ conversion}}{100}}\right)$$

In previous testing with $Al_2O_3$ pellets (Harshaw Al-4104E) visual inspection of the microreactor catalyst showed carbon formation in the catalyst bed. However, addition of calcium oxide and rhodium according to the present invention to this same alumina substantially eliminated such carbon formation. With the $Al_2O_3$ pellets the carbon deposited was of sufficient magnitude to form a matrix which encapsulated the alumina particles and resulted in a large aggregate of many alumina particles encased in carbon. When the $Al_2O_3$ pellets were CaO impregnated and treated with rhodium as in the Example, no carbon was found in the catalyst bed.

As stated above, in the autothermal reforming process fuel, steam and preheated air are mixed and passed over the catalyst bed. The air is added to the reactants to raise the temperature of the reactants and supply the endothermic heat for reaction. In order to operate efficiently, the quantity of air added must be kept to a minimum. A representative ratio of oxygen to carbon in the hydrocarbon is 0.35 to 1 to 1360° F. (738° C.) (note FIG. 1) significantly lower than the 0.42-0.46 using commercial nickel catalysts. This tends to lower reaction temperature and increase the activity of the catalysts used in this environment. At operating temperatures, conventional steam reforming catalysts such as nickel on alpha alumina are deficient in activity.

Figure 3:
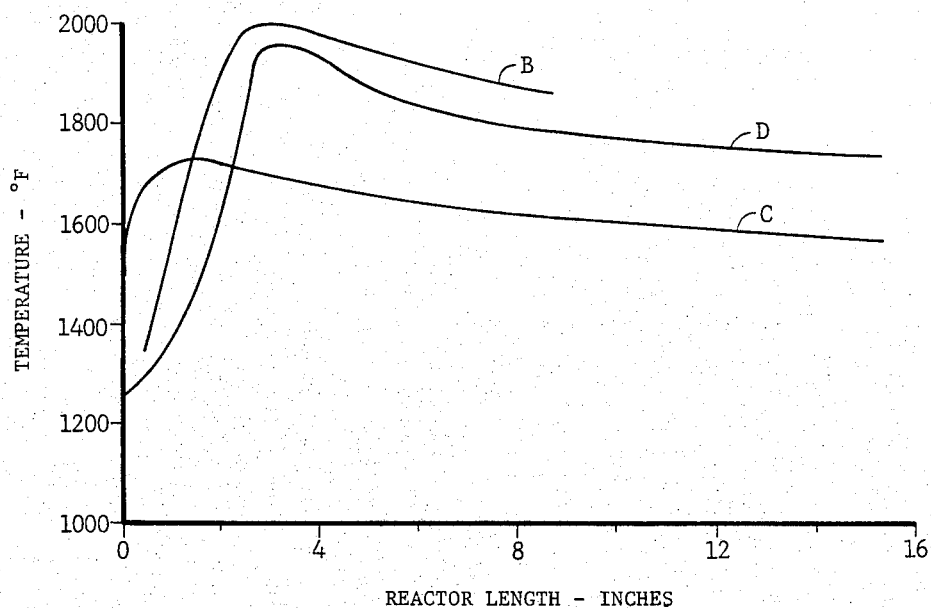
FIG. 3 shows the low temperature rise with catalysts according to the present invention as a result of its high activity.

The high activity of the rhodium catalyst according to the present invention not only allows the reforming process to take place at lower temperatures than with conventional nickel reforming catalysts and metal oxide catalysts, but because of the rapid reforming taking place at the reactor inlet, temperatures do not peak as high as with other catalysts as shown in FIG. 3. Testing was performed in the autothermal reformer described above, the full length of the reformer being filled with catalyst and temperature measurements made with standard commercial thermocouples. B, C and D are as defined in FIG. 1.

Figure 4:
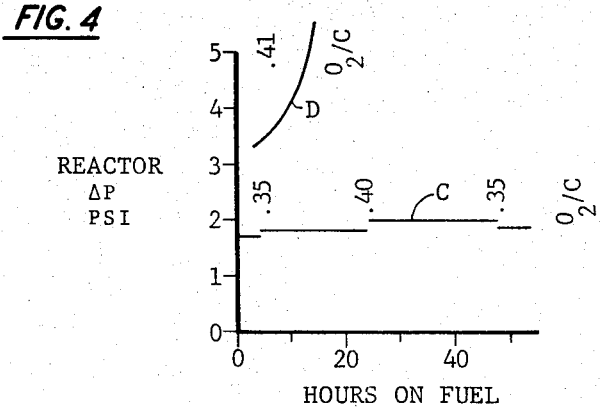
FIG. 4 shows pressure drop increase of reforming catalysts in an autothermal reformer.

In FIG. 4 in the same autothermal reactor using No. 2 fuel oil and C— the rhodium catalyst according to the present invention and D— commercial catalyst (25% nickel on alpha alumina) change in pressure in the reactor was measured over the period of time indicated. As can be seen from the Figure there was a significant increase in the pressure drop with time with commercial nickel catalyst indicating significant carbon formation but lack of pressure drop increase with the catalyst according to the present invention indicating no carbon formation. The $O_2/C$ ratios are indicated in the Figure, for C varying from 0.35 0.40 back to 0.35, and for D run at 0.41.

While the rhodium catalysts according to the present invention can be used alone, a particularly attractive arrangement for the autothermal reformer includes the use of an inlet portion of iron oxide or other high temperature carbon tolerant catalyst in such reformer. Note commonly assigned copending application Ser. No. 372,252 filed of even date herewith entitled Steam Reforming Utilizing Iron Oxide Catalyst, the disclosure of which is incorporated by reference.

In this inlet region, all the oxygen reacts with the hydrocarbon and temperatures increase very rapidly. Downstream of this region, the reactor is loaded with the high activity rhodium catalyst of the present invention. In this latter region, hydrocarbon and reaction intermediates react with steam. Due to the endothermic nature of the reaction with steam, temperatures drop, and it is important to have a high activity catalyst in this region. Typical ratios for such multi-catalyst system are one-third of the reactor length comprising e.g. iron oxide catalyst and two-thirds of the reactor length comprising the high activity rhodium of the present inventiion. The use of such a multiple catalyst system allows greater flexibility in the maximum allowable reactor temperature and the method of introducing the air into the reactor.

While the steam reformers according to the present invention are not limited to a fuel cell application, when used for this purpose sulfur containing fuels ranging from sulfur containing natural gas to heavier sulfur containing fuel such as No. 2 fuel oil can be successfully used with the present invention. Synthetic fuels such as gasified coal and coal derived liquids are also suitable for use with the present invention. Hydrocarbons derived from sources other than petroleum such as coal and shale oil are similarly suitable for use with the present invention as long as the properties of such fuel are at least equal to that of natural gas or mixtures of natural gas and No. 2 fuel oil. Furthermore, the catalysts according to the present invention are useful with any system where carbon formation is a problem such as oxidation reactions, gasification of heavy fuels, steam cracking as in ethylene production, etc.

Although the present invention has been described specifically in terms of autothermal reforming, it would be obvious to one skilled in this art that such systems could be used in the other types of steam reformers as well. Furthermore, although the entire range of useful fuels has not been run through the catalyst systems according to the present invention, based on the reactions involved, it is felt that any hydrocarbon fuel with a boiling point as high as No. 2 fuel oil is useful with the catalyst of the present invention. Furthermore, the catalysts according to the present invention are useful with any system where carbon formation is a problem such as oxidation reactions, gasification of heavy fuels, steam cracking as in ethylene production, etc.

Although this invention has been shown and described with respect to detailed embodiments thereof, it will be understood by those skilled in the art that various changes in form and detail thereof may be made without departing from the spirit and scope of the claimed invention.

We claim:

1. A high activity catalyst specifically adapted for substantially carbon-free use in an autothermal reformer comprising by weight about 0.01% to about 6% rhodium supported on an alumina substrate having deposited thereon about 10% to about 35% calcium oxide and in which the alumina substrate is promoted with magnesium oxide containing about 3% to about 15% magnesium.

2. The catalyst of claim 1 where the substrate is in the form of pellets.

* * * * *

UNITED STATES PATENT AND TRADEMARK OFFICE
CERTIFICATE OF CORRECTION

PATENT NO. : 4,415,484

DATED : November 15, 1983

INVENTOR(S) : Herbert J. Setzer; Roger R. Lesieur; Sam Karavolis; and Wayne G. Wnuck It is certified that error appears in the above-identified patent and that said Letters Patent is hereby corrected as shown below:

On the title page:

Insert as the 4th Inventor

--Wayne G. Wnuck, Stafford Springs, Connecticut--

Column 2, line 29 after pellets insert --are--

Column 4, line 10 "to" second occurrence should read --at--.

Column 4, line 40 after 0.35 insert --to--

Signed and Sealed this

Twenty-first Day of May 1985

[SEAL]

Attest:

DONALD J. QUIGG

Attesting Officer     Acting Commissioner of Patents and Trademarks